US012633102B2

(12) United States Patent

Qi et al.

(10) Patent No.: US 12,633,102 B2

(45) Date of Patent: May 19, 2026

(54) MULTI-TASK PANOPTIC DRIVING PERCEPTION METHOD AND SYSTEM BASED ON IMPROVED YOU ONLY LOOK ONCE VERSION 5 (YOLOv5)

(71) Applicant: NANJING UNIVERSITY OF SCIENCE AND TECHNOLOGY, Nanjing (CN)

(72) Inventors: Yong Qi, Nanjing (CN); Xin Zeng, Nanjing (CN)

(73) Assignee: NANJING UNIVERSITY OF SCIENCE AND TECHNOLOGY, Nanjing (CN)

( * ) Notice: Subject to any disclaimer, the term of this patent is extended or adjusted under 35 U.S.C. 154(b) by 243 days.

(21) Appl. No.: 18/711,367

(22) PCT Filed: Apr. 21, 2023

(86) PCT No.: PCT/CN2023/089631
§ 371 (c)(1),
(2) Date: May 17, 2024

(87) PCT Pub. No.: WO2024/060605
PCT Pub. Date: Mar. 28, 2024

(65) Prior Publication Data
US 2025/0005914 A1 Jan. 2, 2025

(30) Foreign Application Priority Data
Sep. 20, 2022 (CN) .......................... 202211141578.X

(51) Int. Cl.
*G06V 10/80* (2022.01)
*G06V 10/77* (2022.01)
(Continued)

(52) U.S. Cl.
CPC ........ *G06V 10/806* (2022.01); *G06V 10/7715* (2022.01); *G06V 10/82* (2022.01); *G06V 20/54* (2022.01); *G06V 20/588* (2022.01)

(58) Field of Classification Search
CPC .. G06V 10/806; G06V 10/7715; G06V 10/82; G06V 20/54; G06V 20/588;
(Continued)

(56) References Cited

U.S. PATENT DOCUMENTS 10,452,959 B1 * 10/2019 Gautam ............... G06V 10/764
10,929,977 B2 * 2/2021 Wang .................... G06V 10/82
(Continued)

OTHER PUBLICATIONS

"Ghost-YOLOX: A Lightweight and Efficient Implementation of Object Detection Model"; Wang, Chun-Zhi, 2022 26th International Conference on Pattern Recognition (ICPR) Aug. 21-25, 2022, Montreal, Quebec, Canada (Year: 2022).*

*Primary Examiner* — Michael S Osinski
(74) *Attorney, Agent, or Firm* — Birchwood IP

(57) ABSTRACT

The present disclosure provides a multi-task panoptic driving perception method and system based on improved You Only Look Once version 5 (YOLOv5). The method in the present disclosure includes: performing image preprocessing on an image in a dataset to obtain an input image; extracting a feature of the input image by using a backbone network of improved YOLOv5, to obtain a feature map, where the backbone network is obtained by replacing a C3 module in a backbone network of YOLOv5 with an inverted residual bottleneck module; inputting the feature map into a neck network to obtain a feature map, and fusing the obtained feature map and the feature map obtained by the backbone network; inputting the fused feature map into a detection head to perform traffic target detection; and inputting the feature map of the neck network into a branch
(Continued)

network to perform lane line detection and drivable area segmentation.

20 Claims, 6 Drawing Sheets

(51) Int. Cl.
| | | |
|---|---|---|
| *G06V 10/82* | (2022.01) | |
| *G06V 20/54* | (2022.01) | |
| *G06V 20/56* | (2022.01) | |

(58) Field of Classification Search
CPC ...... G06V 10/26; G06V 10/454; G06V 20/56; G06V 10/20; G06V 10/40; G06V 10/764; G06V 10/25; G06V 20/58; G06V 2201/07; G06V 10/771; G06V 10/255; G06V 10/44; G06V 10/761; G06V 10/774; G06V 10/776; G06V 20/70; G06N 3/0464; G06N 3/08; G06N 3/045; G06N 3/09; G06N 3/04; G06N 3/084; G06N 3/048; G06N 7/01; G06T 2207/20084; G06T 2207/20081; G06T 7/11; G06T 2207/20016; G06T 7/73; G06T 2207/10024; G06T 2207/20221; G06F 18/253; G06F 18/214; G06F 18/2163; G06F 18/243

See application file for complete search history.

(56) References Cited

U.S. PATENT DOCUMENTS

| | | | | |
|---|---|---|---|---|
| 10,979,622 | B2 * | 4/2021 | Wang | G06V 10/764 |
| 11,257,252 | B2 * | 2/2022 | Wen | G06T 9/00 |
| 11,410,035 | B2 * | 8/2022 | Fang | G06N 3/04 |
| 11,593,587 | B2 * | 2/2023 | Lee | G06V 10/764 |
| 11,790,640 | B1 * | 10/2023 | Yue | G06V 20/05 |
| | | | | 382/110 |
| 11,816,881 | B2 * | 11/2023 | Paik | G06V 10/806 |
| 11,868,863 | B2 * | 1/2024 | Dal Mutto | G06T 7/0002 |
| 11,989,956 | B2 * | 5/2024 | Dai | G06V 20/64 |
| 12,469,249 | B2 * | 11/2025 | Zhang | G06V 10/806 |
| 12,505,336 | B2 * | 12/2025 | Dua | G06N 3/063 |
| 2020/0074661 | A1 * | 3/2020 | Anisimovskiy | G06T 3/02 |
| 2020/0160559 | A1 * | 5/2020 | Urtasun | G06N 3/084 |
| 2020/0250462 | A1 * | 8/2020 | Yang | G06N 3/08 |
| 2020/0387698 | A1 * | 12/2020 | Yi | G06N 3/0455 |
| 2021/0004572 | A1 * | 1/2021 | Hu | G06N 3/0464 |
| 2021/0365716 | A1 * | 11/2021 | Li | G06N 3/09 |
| 2021/0365724 | A1 * | 11/2021 | Lee | G06T 7/73 |
| 2022/0019843 | A1 * | 1/2022 | Wang | G06V 10/82 |
| 2023/0017578 | A1 * | 1/2023 | Su | G06V 20/70 |
| 2023/0081263 | A1 * | 3/2023 | Zhou | G06V 10/26 |
| | | | | 382/103 |
| 2023/0102467 | A1 * | 3/2023 | He | G06V 10/764 |
| | | | | 382/103 |
| 2023/0127939 | A1 * | 4/2023 | Zhu | G06T 5/70 |
| | | | | 382/131 |
| 2023/0144209 | A1 * | 5/2023 | Cai | G06N 3/0464 |
| 2024/0013505 | A1 * | 1/2024 | Zheng | G06V 10/774 |
| 2024/0037741 | A1 * | 2/2024 | Chien | A61B 6/5217 |
| 2024/0078790 | A1 * | 3/2024 | Sundareshan | G01C 21/3822 |
| 2024/0104900 | A1 * | 3/2024 | Long | G06V 10/7715 |
| 2024/0419382 | A1 * | 12/2024 | Dekel | G06V 20/70 |
| 2024/0419972 | A1 * | 12/2024 | Guo | G06N 3/084 |
| 2025/0029369 | A1 * | 1/2025 | Sun | G06T 5/60 |
| 2025/0104423 | A1 * | 3/2025 | Wen | G06V 10/82 |
| 2025/0239057 | A1 * | 7/2025 | Luo | G06V 10/7715 |
| 2025/0272992 | A1 * | 8/2025 | Zhou | G06N 3/04 |

* cited by examiner

MULTI-TASK PANOPTIC DRIVING PERCEPTION METHOD AND SYSTEM BASED ON IMPROVED YOU ONLY LOOK ONCE VERSION 5 (YOLOv5)

CROSS REFERENCE TO RELATED APPLICATIONS

The present application is a national stage application of International Patent Application No. PCT/CN2023/089631, filed on Apr. 21, 2023, which claims priority to the Chinese Patent Application No. 202211141578.X, filed with the China National Intellectual Property Administration (CNIPA) on Sep. 20, 2022, and entitled "MULTI-TASK PANOPTIC DRIVING PERCEPTION METHOD AND SYSTEM BASED ON IMPROVED YOU ONLY LOOK ONCE VERSION 5 (YOLOv5)", which is incorporated herein by reference in its entirety.

TECHNICAL FIELD

The present disclosure relates to the technical field of autonomous driving, and specifically, to a multi-task panoptic driving perception method and system based on improved You Only Look Once version 5 (YOLOv5).

BACKGROUND

Deep learning lies at the core of progress in many fields, especially in the field of autonomous driving. Many deep learning applications pertaining to an autonomous vehicle comprise a perception system of the autonomous vehicle. The perception system can extract visual information from an image captured by a monocular camera mounted on the vehicle, and help a decision-making system of the vehicle make a good driving decision, to control a behavior of the vehicle. Therefore, to enable the vehicle to safely drive on a road while observing traffic regulations, the visual perception system should be able to process surrounding scenario information in real time and then help the decision-making system make judgments, including regarding a position of an obstacle, whether the road is drivable, decisions regarding a position of a lane, and the like. Therefore, a panoptic driving perception algorithm must ensure three key tasks: traffic target detection, drivable area segmentation, and lane line detection.

Multiple prior art researchers have proposed a multi-task network. The multi-task network can process a plurality of tasks simultaneously instead of processing the tasks one by one, to accelerate an image analysis process. The multi-task network can also share information among the tasks, which may improve performance of each task because the multi-task network may share a same backbone network for feature extraction. Some prior art researchers have proposed an instance segmentation algorithm named Mask Region Convolutional Neural Network (Mask R-CNN), which is used to jointly detect an object and segment an instance, such that state-of-the-art performance is achieved for each task. However, the Mask R-CNN cannot detect a drivable area and a lane line, and as a result, cannot be directly applied to the field of intelligent transportation. Some prior art researchers have proposed a MultiNet network structure. The MultiNet network structure comprises a shared backbone network and three separate branch networks for classification, object detection, and semantic segmentation. The MultiNet network structure performs well on these tasks and achieves state-of-the-art performance for a drivable area segmentation task in a KITTI dataset. However, in a panoptic driving perception system, a classification task is not as important as lane line detection. Some prior art researchers have proposed a DLT-Net network structure. The DLT-Net network structure combines the traffic target detection, the drivable area segmentation, and the lane line detection, and proposes a context tensor to fuse feature maps of branch networks to share mutual information. The DLT-Net network structure has competitive performance, but cannot achieve real-time performance. Some prior art researchers have built an efficient multi-task network (You Only Look Once Plus (YOLOP)) for the panoptic driving perception system. This network includes the target detection, the drivable area segmentation, and the lane line detection, and can be deployed on an embedded device Jetson TX2 through TensorRT to achieve the real-time performance. Although the network has achieved state-of-the-art performance for both the real-time performance and high precision, three branch networks of the network are respectively used to process three different tasks, which increases reasoning time of the network.

In conclusion, in the panoptic driving perception algorithm, for the drivable area segmentation and the lane line detection, different branch networks are used for network reasoning, which increases the reasoning time of the network. Therefore, there is room for improvement.

SUMMARY

In view of deficiencies in the prior art, the present disclosure provides a multi-task panoptic driving perception method and system based on improved YOLOv5, which can process surrounding scenario information of a vehicle in real time and with high precision to help a decision-making system of the vehicle make a judgment, and can also complete traffic target detection, drivable area segmentation, and lane line detection simultaneously.

Specifically, the present disclosure is implemented by the following technical solutions.

In a first aspect, the present disclosure provides a multi-task panoptic driving perception method based on improved You Only Look Once version 5 (YOLOv5), including:

performing, by using an image preprocessing method of You Only Look Once version 4 (YOLOv4), image preprocessing on each frame of an image in a video captured by a vehicle-mounted camera, to obtain an input image:

extracting a feature of the input image by using a backbone network of improved YOLOv5, to obtain a feature map, wherein the backbone network of the improved YOLOv5 is obtained by replacing a C3 module in a backbone network of YOLOv5 with an inverted residual bottleneck module: the inverted residual bottleneck module including x inverted residual bottleneck component structures, wherein x is a natural number; and the inverted residual bottleneck component structures each including three layers, wherein a first layer comprises a convolutional component to map low-dimensional space onto high-dimensional space for dimensional extension, a second layer comprises a deep separable convolutional layer to perform spatial filtering through deep separable convolution, and a third layer comprises a convolutional component to map the high-dimensional space onto the low-dimensional space;

inputting the feature map obtained by the backbone network of the improved YOLOv5 into a neck network, and fusing a feature map obtained through a spatial pyramid pooling (SPP) network and a feature pyramid network (FPN) and the feature map obtained by the backbone network of the improved YOLOv5 in the neck network to obtain a fused feature map;

inputting the fused feature map into a detection head, obtaining a multi-scale fused feature map through a path aggregation network (PAN), and performing traffic target detection on the multi-scale fused feature map by using an anchor-based multi-scale detection scheme of the YOLOv4; and inputting an underlying feature map of the feature map obtained through the SPP network and the FPN into a branch network, and performing lane line detection and drivable area segmentation by using the branch network.

Further, the image preprocessing further includes adjusting each frame of image in the video captured by the vehicle-mounted camera from an image whose width×height×channel quantity is 1280×720×3 to an image whose width×height×channel quantity is 640×384×3.

Further, the backbone network of the improved YOLOv5 adopts three inverted residual bottleneck modules;

a first inverted residual bottleneck module is CSPI_1, which is constituted by a convolutional component Conv and one inverted residual bottleneck component structure through a Concat operation;

a second inverted residual bottleneck module is CSPI_3, which is constituted by a convolutional component Conv and two inverted residual bottleneck component structures through the Concat operation;

a third inverted residual bottleneck module is CSPI_3, which is constituted by a convolutional component Conv and three inverted residual bottleneck component structures through the Concat operation;

the convolutional component Conv includes a conv function, a Bn function, and a SiLU function;

the feature map obtained by extracting the feature of the input image by using the backbone network of the improved YOLOv5 includes a feature map out1, a feature map out2, and a feature map out3:

the feature map out1 is a feature map obtained after a preprocessed image is processed first by Focus, then by the Conv and the CSPI_1, and finally by the Conv and the CSPI_3;

the feature map out2 is a feature map obtained after the feature map out1 is processed by the Conv and the CSPI_3; and the feature map out3 is a feature map obtained after the feature map out2 is processed by the Conv.

Further, in the FPN, the feature map input by the SPP network is processed by the inverted residual bottleneck module and the Conv in sequence to obtain a high-level feature map f3, and the high-level feature map f3 is output to the detection head;

the high-level feature map f3 is upsampled, a feature map obtained by performing the Concat operation on an upsampled high-level feature map f3 and the feature map out2 is processed by the inverted residual bottleneck module and the Conv in sequence to obtain a mid-level feature map f2, and the mid-level feature map f2 is output to the detection head; and the mid-level feature map f2 is upsampled, and then an underlying feature map f1 is obtained by performing the Concat operation on an upsampled mid-level feature map f2 and the feature map out1 and output to the detection head.

Further, the branch network includes four convolutional component layers, three BottleneckCSP module layers, and three upsampling layers; and the performing lane line detection and drivable area segmentation by using the branch network includes: restoring the underlying feature map f1 in the FPN to a W×H×4 feature map after processing the underlying feature map f1 by the three upsampling layers in the branch network, wherein W represents a width of the input image, H represents a height of the input image, feature points in the feature map one-to-one correspond to pixels in the input image, and 4 represents that each feature point in the feature map has four values; and segmenting, by the branch network, the W×H×4 feature map into two W×H×2 feature maps, wherein one of the W×H×2 feature maps represents a probability that each pixel in the input image corresponds to a background of a drivable area, and is used to predict the drivable area, and the predicted drivable area is used as a result of the drivable area segmentation; and the other W×H×2 feature map represents a probability that each pixel in the input image corresponds to a background of a lane line, and is used to predict the lane line, and the predicted lane line is used as a result of the lane line detection, wherein W represents the width of the input image: H represents the height of the input image; and 2 represents that each feature point in the feature map has two values, which are respectively used to represent a probability that a corresponding pixel of the feature point has a target and a probability that the corresponding pixel of the feature point has no target.

Further, a nearest interpolation method is used in the upsampling layer for upsampling processing.

In another aspect, the present disclosure provides a multi-task panoptic driving perception system based on improved YOLOv5 for implementing the above multi-task panoptic driving perception method based on improved YOLOv5, including:

a human-computer interaction module configured to provide a reserved input interface to obtain input data in a correct format;

a multi-task detection module configured to complete traffic target detection, lane line detection, and drivable area segmentation based on the input data obtained by the human-computer interaction module, and output results of the traffic target detection, the lane line detection, and the drivable area segmentation to a display module; and the display module configured to display the input data and the results of the traffic target detection, the lane line detection, and the drivable area segmentation that are output by the multi-task detection module.

Further, the multi-task panoptic driving perception system based on improved YOLOv5 includes:

a traffic target detection module configured to complete the traffic target detection, and output the result of the traffic target detection, a traffic target category, and a precision rate of the traffic target detection to the display module;

a lane line detection module configured to complete the lane line detection, and output the result and a precision rate of the lane line detection to the display module; and a drivable area segmentation module configured to complete the drivable area segmentation and output the result of the drivable area segmentation to the display module; wherein the display module is capable of displaying the traffic target category, the precision rate of the traffic target detection, or the precision rate of the lane line detection.

In still another aspect, the present disclosure provides a multi-task panoptic driving perception device based on improved YOLOv5, including a memory and a processor, wherein the memory stores a computer program for implementing a multi-task panoptic driving perception method based on improved YOLOv5, and the processor executes the computer program to implement steps of the above method.

In yet another aspect, the present disclosure provides a computer-readable storage medium storing a computer program, wherein the computer program is executed by a processor to implement steps of the above method.

The multi-task panoptic driving perception method and system based on improved YOLOv5 in the present disclosure have following beneficial effects:

The multi-task panoptic driving perception method and system based on improved YOLOv5 in the present disclosure adopt a multi-task panoptic driving perception algorithm framework based on a YOLOv5 network structure, namely, driving perception-YOLO (DP-YOLO), use an end-to-end network to achieve real-time and high-precision traffic target detection, drivable area segmentation, and lane line detection.

The multi-task panoptic driving perception method and system based on improved YOLOv5 in the present disclosure design an inverted residual bottleneck module (CSPI_x module), and replace an original C3 module in a backbone network of YOLOv5 with the inverted residual bottleneck module. The inverted residual bottleneck module (CSPI_x module) is constituted by x inverted residual bottleneck component structures, where x is a natural number. The CSPI_x module maps a feature of a base layer onto two parts, and then merges the two parts through a cross-stage hierarchical structure. This can greatly reduce a computational load of the backbone network and improve a running speed of the backbone network, while keeping precision basically unchanged. For a system with a high real-time requirement, the inverted residual bottleneck module allows for a unique and effective memory management approach, thereby improving recognition precision of a network model.

The multi-task panoptic driving perception method and system based on improved YOLOv5 in the present disclosure design a branch network, which is constituted by four convolutional component (Conv) layers, three Bottleneck-CSP module layers, and three upsampling layers. The branch network can simultaneously train two tasks: drivable area segmentation and lane line detection. The BottleneckCSP module can enhance a feature fusion capability of the network, thereby improving detection precision. An underlying feature map output by a feature pyramid network (FPN) is input into a branch network used for the drivable area segmentation. An underlying layer of the FPN has strong semantic information and high-resolution information that is beneficial for positioning. Further, a nearest interpolation method is used in the upsampling layer for upsampling processing to reduce a computational cost. The branch network in the present disclosure not only obtains a high-precision output, but also reduces its reasoning time, thereby increasing a feature extraction speed of the branch network while imposing a little impact on the precision.

The multi-task panoptic driving perception system based on improved YOLOv5 provided in the present disclosure facilitates presentation of results of the traffic target detection, the lane line detection, and the drivable area segmentation that are performed according to the multi-task panoptic driving perception method based on improved YOLOv5.

The multi-task panoptic driving perception method and system based on improved YOLOv5 in the present disclosure can simultaneously perform the traffic target detection, the drivable area segmentation, and the lane line detection. Compared with other existing methods, the present disclosure has a higher reasoning speed and higher detection accuracy. The multi-task panoptic driving perception method and system based on improved YOLOv5 in the present disclosure can better process surrounding scenario information of a vehicle and then help a decision-making system of the vehicle make a judgment, thereby achieving good practical feasibility.

BRIEF DESCRIPTION OF THE DRAWINGS

FIG. 3A shows the inverted residual bottleneck module (CSPI_x module), and FIG. 3B shows an inverted residual bottleneck component structure (Invert Bottleneck);

DETAILED DESCRIPTION

The present disclosure is further described in more detail below with reference to implementations and accompanying drawings.

Implementation 1

This implementation of the present disclosure provides a panoptic driving perception method based on improved YOLOv5, which is a simple and efficient detection method (DP-YOLO). A hardware condition and a related software configuration for implementing this implementation are as follows:

A version of an operating system of an experimental machine is CentOS Linux release 7.6.1810, a model of a central processing unit (CPU) is HygonC86 7185 32-core Processor CPU @ 2.0 GHz, a model of a graphics processing unit (GPU) is NVIDIA Tesla T4, a size of a video memory is 16 GB, and a memory size is 50 GB.

Program code is implemented using Python 3.8 and Pytorch 1.9, and the GPU is accelerated using cuda 11.2 and cudnn 7.6.5. An iteration quantity of a model is set to 200, and an input data size per batch is 24, indicating that 24 training samples are taken from a training set for each training. An initial learning rate is set to 0.01, and momentum and weight attenuations are set to 0.937 and 0.0005, respectively. During the training, a learning rate is adjusted through preheating and cosine annealing to make the model converge faster and better.

Figure 1:
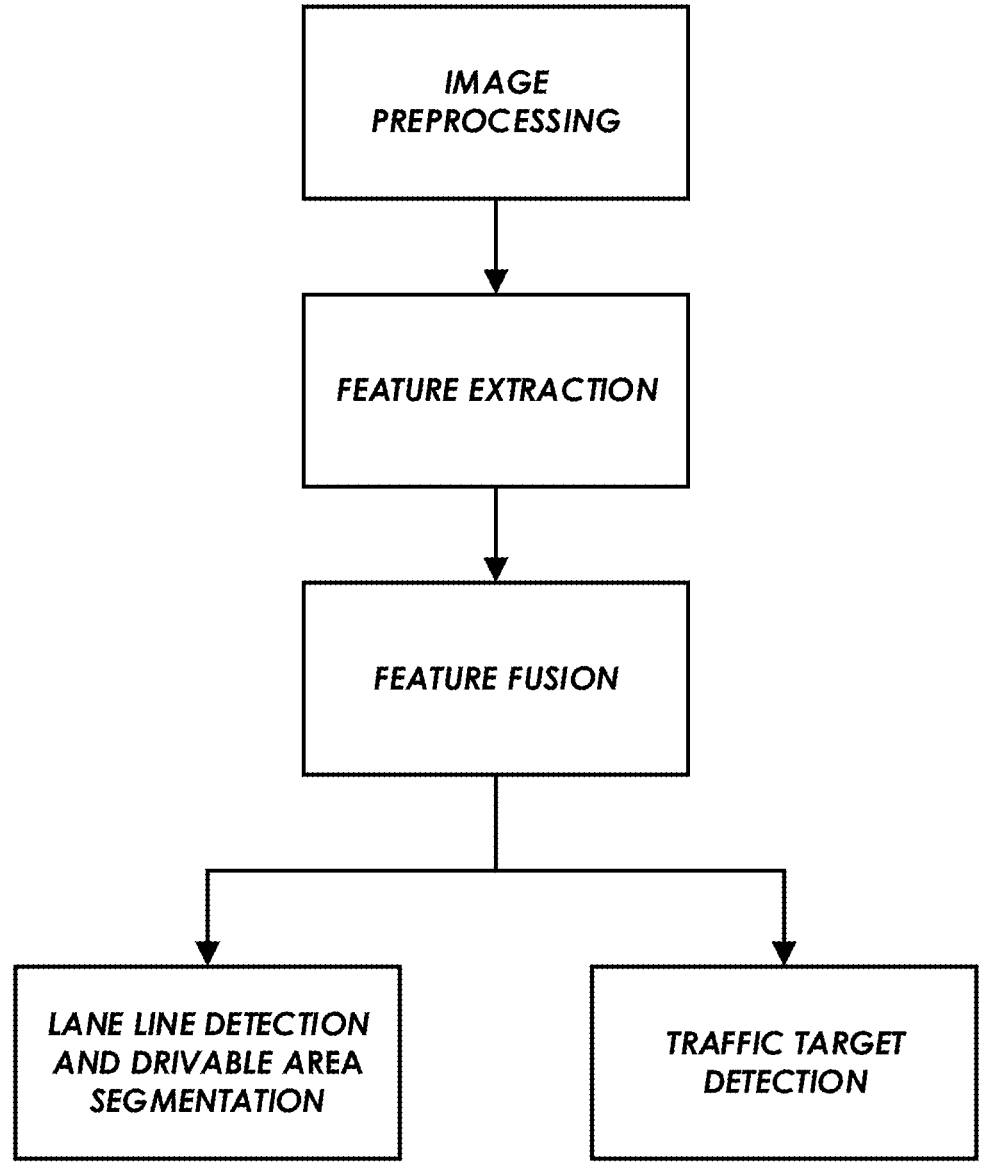
FIG. 1 is a flowchart of a method according to the present disclosure.

As shown in FIG. 1, the panoptic driving perception method based on improved YOLOv5 in this implementation includes following steps.

1: Perform image preprocessing.

By using an image preprocessing method of YOLOv4, the present disclosure performs image preprocessing on each frame of image in a video captured by a vehicle-mounted camera to obtain an input image. The image preprocessing method of the YOLOv4 is used to delete irrelevant information from an original image, restore useful real information, enhance detectability of relevant information, and simplify data to a large extent, to improve reliability of feature extraction, image segmentation, matching, and recognition.

In this implementation, a BDD 100 K dataset is selected to train and evaluate a network model of the present disclosure. The BDD 100 K dataset is divided into three parts, namely, a 70 K image training set, a 10 K image validation set, and a 20 K image test set. Because a label of the test set is not public, the network model is evaluated on the validation set.

Preferably, in another implementation, in order to reduce memory usage, each frame of image in the BDD 100 K dataset is adjusted from an image whose width×height×channel quantity is 1280×720×3 to an image whose width×height×channel quantity is 640×384×3. The width and the height are in units of pixels.

2: Perform feature extraction, that is, extract a feature of the input image by using a backbone network of improved YOLOv5.

Figure 2:
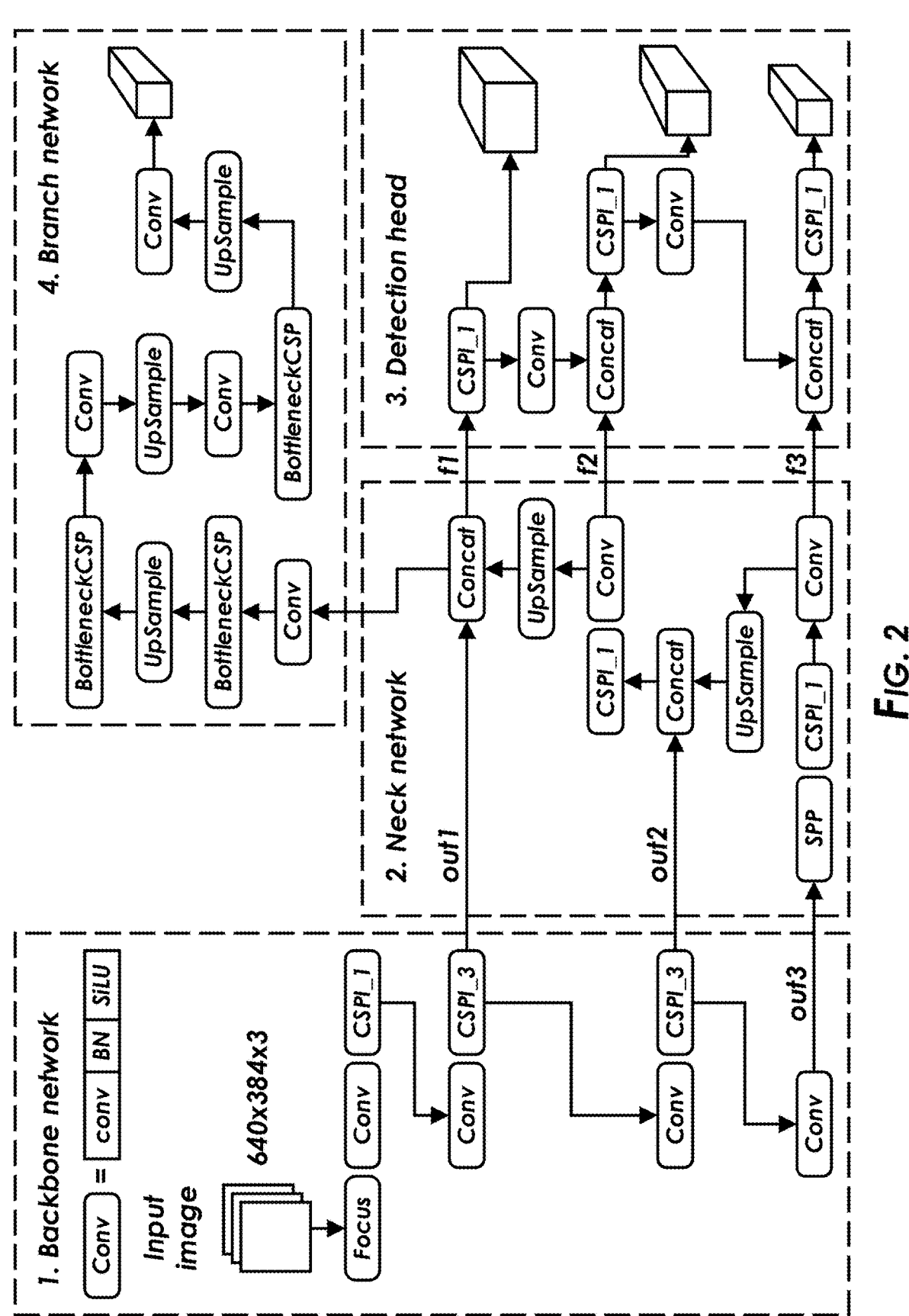
FIG. 2 is a schematic structural diagram of a network model according to an implementation of the present disclosure.
Figure 3A:
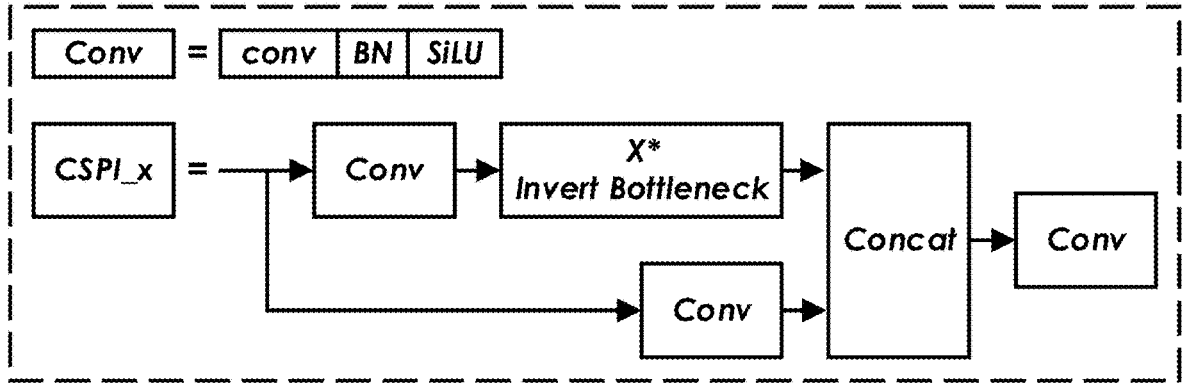
FIGS. 3A-B are schematic structural diagrams of an inverted residual bottleneck module according to an implementation of the present disclosure, where

As shown in FIG. 2, the multi-task panoptic driving perception method and system based on improved YOLOv5 in the present disclosure adopt the backbone network of the improved YOLOv5, and replace an original C3 module in a backbone network of YOLOv5 with an inverted residual bottleneck module (CSPI_x module). The inverted residual bottleneck module (CSPI_x module) is constituted by x inverted residual bottleneck component structures (Invert-Bottleneck), where x is a natural number. As shown in FIG. 3A, the CSPI_x module in the present disclosure maps a feature of a base layer onto two parts, and then merges the two parts through a cross-stage hierarchical structure. This can greatly reduce a computational load of the network and improve a running speed of the network, while keeping precision basically unchanged. For a system with a high real-time requirement, the inverted residual bottleneck module allows for a unique and effective memory management approach, thereby improving recognition precision of the network model.

Three CSPI_x modules are used in the backbone network of this implementation, as shown in FIG. 2.

A first inverted residual bottleneck module is CSPI_1, which is constituted by a convolutional component Conv and one inverted residual bottleneck component structure through a Concat operation.

A second inverted residual bottleneck module is CSPI_3, which is constituted by a convolutional component Conv and two inverted residual bottleneck component structures through the Concat operation.

A third inverted residual bottleneck module is CSPI_3, which is constituted by a convolutional component Conv and three inverted residual bottleneck component structure through the Concat operation.

The convolutional component Conv is constituted by a conv function (convolution function), a Bn function (normalization function), and a SiLU function (activation function).

Figure 3B:
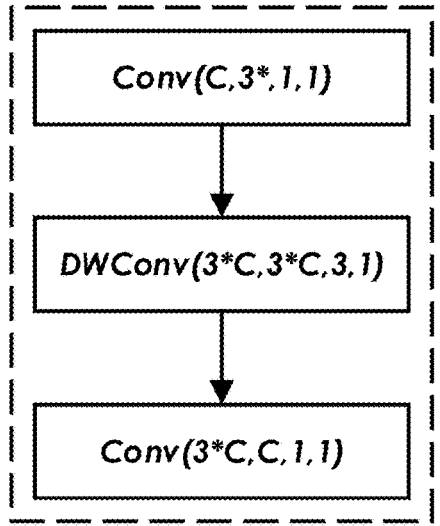

As shown in FIG. 3B, the inverted residual bottleneck component structures (InvertBottleneck) in the CSPI_x module is constituted by three layers. A first layer is a convolutional component (Conv) and maps low-dimensional space onto high-dimensional space for dimensional extension. A second layer is a deep separable convolutional layer (DWConv layer) and performs spatial filtering through deep separable convolution. A third layer is a convolutional component (Conv) and maps the high-dimensional space onto the low-dimensional space. Reasoning speeds of the network when the low-dimensional space is separately mapped onto 2-fold high-dimensional space, 3-fold high-dimensional space, and 4-fold high-dimensional space during the dimensional extension are compared. When the 2-fold high-dimensional space is achieved during the dimensional extension, the reasoning speed can reach 7.9 ms/frame, but detection precision of the network is relatively low. When the 3-fold high-dimensional space is achieved during the dimensional extension, the reasoning speed is 9.1 ms/frame. When the 4-fold high-dimensional space is achieved during the dimensional extension, the reasoning speed reaches 10.3 ms/frame. In another implementation, compared with the dimensional extension to the 4-fold high-dimensional space, the mapping the low-dimensional space onto the 3-fold high-dimensional space slightly decreases the detection precision of the network but reduces the reasoning time and the computational load of the network.

Figure 4:
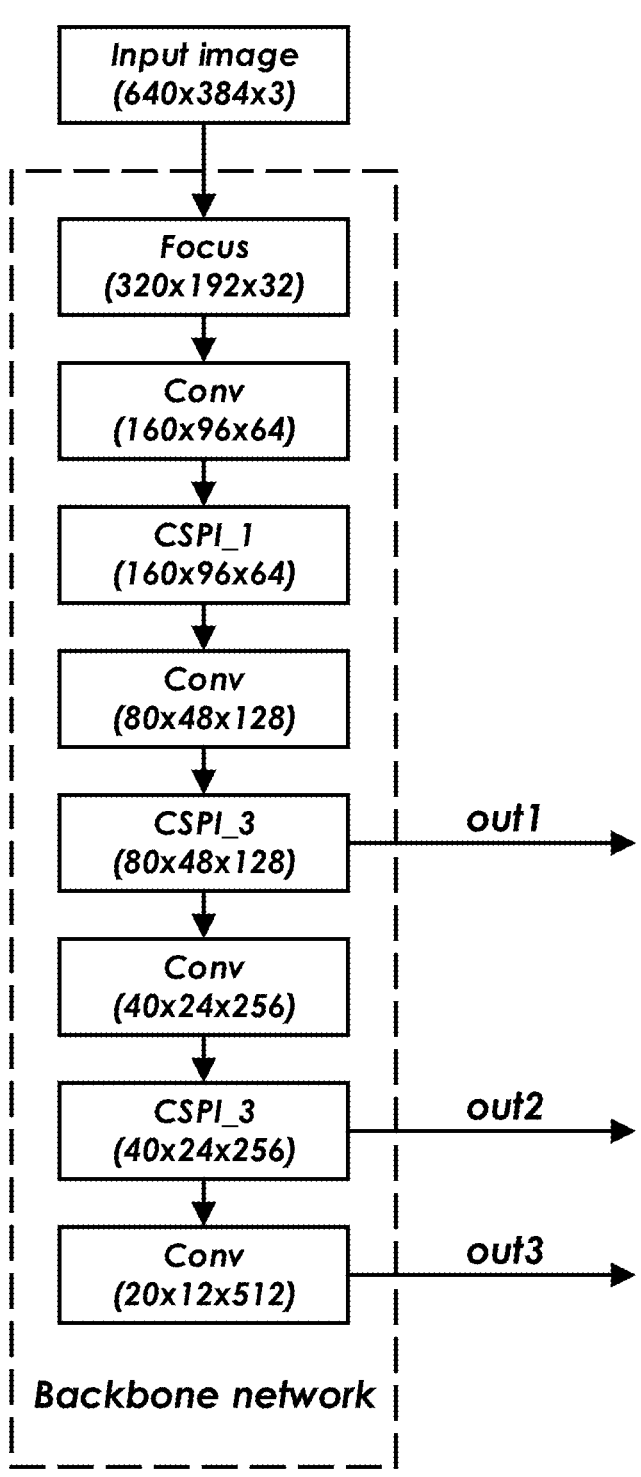
FIG. 4 is a schematic diagram of changes in a size and a channel quantity of a feature map when an input image is processed by a backbone network according to an implementation of the present disclosure.

As shown in FIG. 2 and FIG. 4, a feature map obtained by extracting the feature of the input image by using the backbone network of the improved YOLOv5 includes a feature map out1, a feature map out2, and a feature map out3.

The feature map out1 is a feature map obtained after a preprocessed image is processed first by Focus, then by the Conv and the CSPI_1, and finally by the Conv and the CSPI_3.

The feature map out2 is a feature map obtained after the feature map out1 is processed by the Conv and the CSPI_3.

The feature map out3 is a feature map obtained after the feature map out2 is processed by the Conv.

For example, a size of the preprocessed image (namely, the input image) is 640×384×3, which means that a width, a height, and a channel quantity of the image are 640, 384, and 3 respectively. The preprocessed image is input into the backbone network to finally output the feature map out1 (with a size of 80×48×128), the feature map out2 (with a size of 40×24×256), and the feature map out3 (with a size of 20×12×512). In the backbone network, the size and the channel quantity of the feature map vary according to a following rule:

The input image, namely, the 640×384×3 input image in FIG. 2 and FIG. 4, is processed by the Focus to obtain a 320×192×32 feature map. The 320×192×32 feature map is processed by the Conv and the CSPI_1 to obtain a 160×96×64 feature map. The 160×96×64 feature map is processed by the Conv and the CSPI_3 to obtain an 80×48×128 feature map, which is used as a first output out1. The 80×48×128 feature map is processed by the Conv and the CSPI_3 to obtain a 40×24×256 feature map, which is used as a second output out2. The 40×24×256 feature map is processed by the Conv to obtain a 20×12×512 feature map, which is used as a third output out3. In other words, the preprocessed 640×384×3 image is processed by the backbone network to obtain a 20×12 feature map.

3: Perform feature fusion, that is, input the feature processed by the backbone network into a neck network, and fuse a feature map obtained through a spatial pyramid pooling (SPP) network and an FPN and the feature map obtained by the backbone network to obtain a fused feature map.

The neck network in the present disclosure is constituted by the SPP network and the FPN. The SPP network is primarily used to resolve a problem of size inconsistency of input images. Fusion of features of different sizes in the SPP network is beneficial for a large difference between sizes of objects in a to-be-detected image. The FPN is mainly used to resolve a multi-scale problem in object detection. With a simple network connection change, the FPN significantly improves detection performance of a small object without increasing a computational load of an original network model basically. This step is specifically as follows:

The feature map output by the backbone network is input into the neck network, and is sequentially processed by the SPP network and the FPN to obtain a feature map. Then the obtained feature map is input into a detection head.

With the SPP network, an image of any size can be input into a convolutional neural network. One SPP network layer is added after a last convolutional layer of the convolutional neural network, such that a fixed-length feature map can be output for different feature maps of any sizes through the SPP network.

From the top down, the FPN fuses a high-level feature and an underlying feature through upsampling to obtain a feature map for prediction, and retains a high-level strong semantic feature, thereby enhancing an entire pyramid.

For example, as shown in FIG. 2, the 20×12×512 feature map output by the backbone network is input into the SPP network, and a resulting feature map is then input into the FPN.

Figure 5:
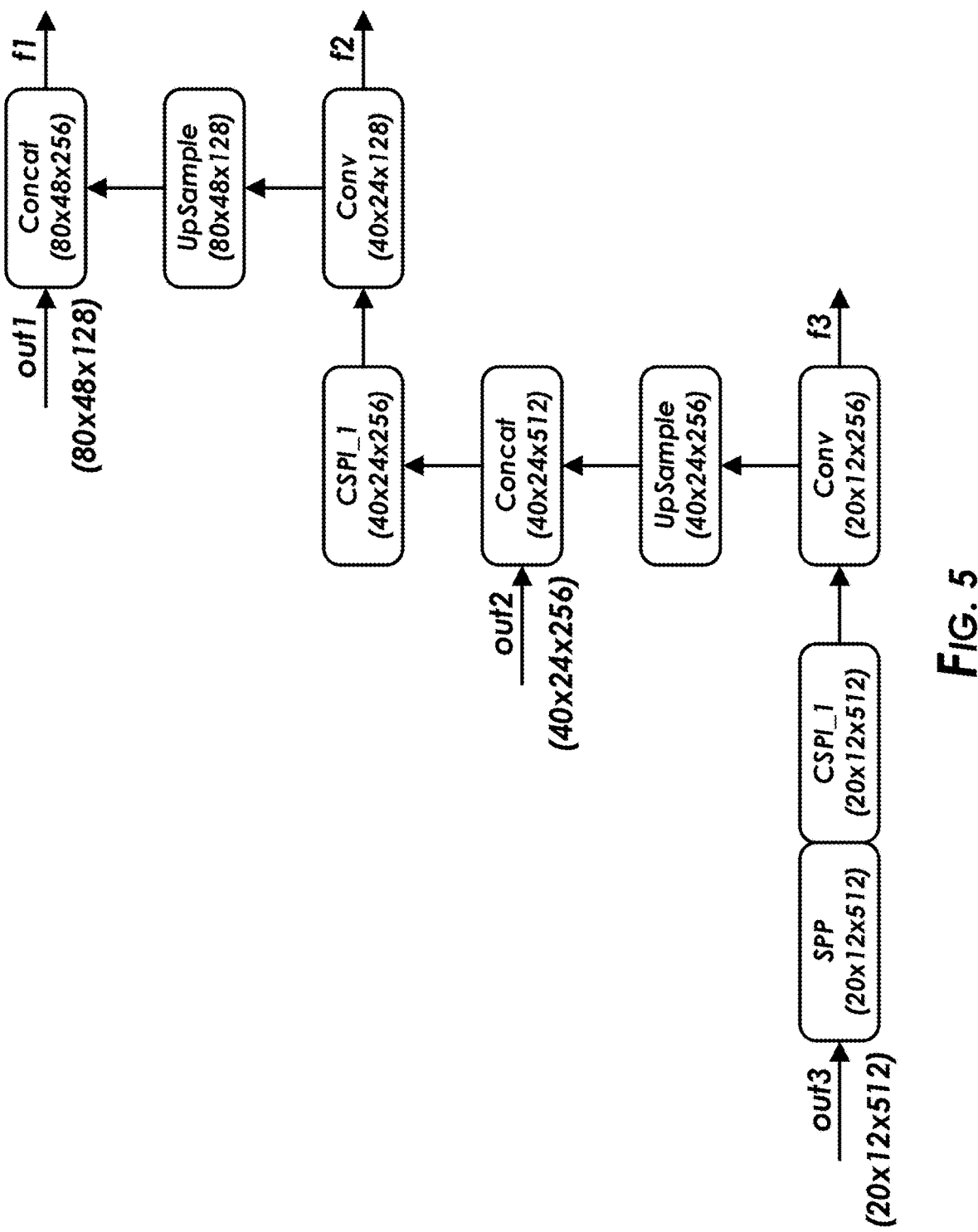
FIG. 5 is a schematic diagram of changes in a size and a channel quantity of a feature map when the feature map is processed by a neck network according to an implementation of the present disclosure.

As shown in FIG. 5, in the FPN, the feature map input by the SPP network is processed by the inverted residual bottleneck module and the Conv in sequence to obtain a high-level feature map f3, and the high-level feature map f3 is output to the detection head.

The high-level feature map f3 is upsampled, a feature map obtained by performing the Concat operation on an upsampled high-level feature map f3 and the feature map out2 obtained by the backbone network is processed by the inverted residual bottleneck module and the Conv in sequence to obtain a mid-level feature map f2, and the mid-level feature map f2 is output to the detection head.

The mid-level feature map f2 is upsampled, and then an underlying feature map f1 is obtained by performing the Concat operation on an upsampled mid-level feature map f2 and the feature map out1 obtained by the backbone network, and output to the detection head.

For example, in the FPN, the 20×12×512 feature map input by the SPP network is processed by the inverted residual bottleneck module to obtain a 20×12×512 feature map, and then the obtained 20×12×512 feature map is processed by the Conv to obtain the 20×12×256 high-level feature map f3, and the 20×12×256 high-level feature map f3 is finally output to the detection head.

The 20×12×256 high-level feature map f3 is upsampled to obtain a 40×24×256 feature map. The Concat operation is performed on the 40×24×256 feature map and the 40×24×256 feature map out2 in the backbone network to obtain the 40×24×256 feature map. The obtained 40×24×256 feature map is processed by the inverted residual bottleneck module (CSPI_1 module) to obtain a 40×24×256 feature map, and then the obtained 40×24×256 feature map is processed by the Conv to obtain the 40×24×128 mid-level feature map f2. Finally, the 40×24×128 mid-level feature map f2 is output to the detection head.

The 40×24×128 mid-level feature map f2 is upsampled to obtain an 80×48×128 feature map, then the Concat operation is performed on the 80×48×128 feature map and the 80×48×128 feature map out1 in the backbone network to obtain the 80×48×256 underlying feature map f1, and finally, the 80×48×256 underlying feature map f1 is output to the detection head.

4: Perform traffic target detection, that is, input the fused feature map obtained through the neck network into the detection head, such that the detection head predicts a traffic target based on an obtained feature. This step is specifically as follows:

The fused feature map is input into the detection head, a multi-scale fused feature map is obtained through a path aggregation network (PAN), and the traffic target detection is performed on the multi-scale fused feature map by using an anchor-based multi-scale detection scheme of the YOLOv4.

The PAN is adopted in the detection head in the present disclosure. The PAN is a bottom-up FPN. A semantic feature is transferred from top to bottom by using the FPN in the neck network, and a positioning feature is transferred from bottom to up by using the PAN, such that a better feature fusion effect is achieved. Then, the multi-scale fused feature map in the PAN is directly used for detection. The anchor-based multi-scale detection scheme of the YOLOv4 includes: assigning a plurality of (for example, 3) prior boxes with different aspect ratios to each grid (for example, there are a total of $20*12=240$ grids in a 20×12×3×6 feature map) of a multi-scale feature map (for example, including the 20×12×3×6 feature map, a 40×24×3×6 feature map, and an 80×48×3×6 feature map). The detection head predicts a position offset, height and width scaling, and a probability and prediction confidence of a corresponding traffic target.

Firstly, three feature maps output by the neck network are input into the PAN to obtain an 80×48×128 feature map, a 40×24×256 feature map, and an 80×48×512 feature map. After the Conv operation, a 20×12×18 map feature, a 40×24×18 feature map, and an 80×48×18 feature map are obtained. In each grid of each feature map, three different prior boxes are configured. After a reshape operation in the detection head, sizes of the 20×12×18 map feature, the 40×24×18 feature map, and the 80×48×18 feature map are respectively 20×12×3×6, 40×24×3×6, and 80×48×3×6. The 20×12×3×6 feature map, the 40×24×3×6 feature map, and the 80×48×3×6 feature map are finally output detection results. Because a position (four dimensions) of a detection box, detection confidence (one dimension), and a category (1 one) have a total of six dimensions, a last feature in the feature map has a dimension of 6, representing the position of the detection box, the detection confidence, and the category. Other features in the feature map have a dimension of M×N×3, where M represents a quantity of rows in a feature matrix, N represents a quantity of columns in the feature matrix, and 3 represents three prior boxes with different scales.

5: Perform lane line detection and drivable area segmentation, that is, perform the lane line detection and the drivable area segmentation by using a branch network.

Because an underlying layer of the FPN has strong semantic information and high-resolution information that is beneficial for positioning, a (W/8)×(H/8)×128 underlying feature map in the feature map obtained through the SPP network and the FPN is input into the branch network, where W represents a width (640 pixels) of the input image, and H represents a height (384 pixels) of the input image.

Figure 6:
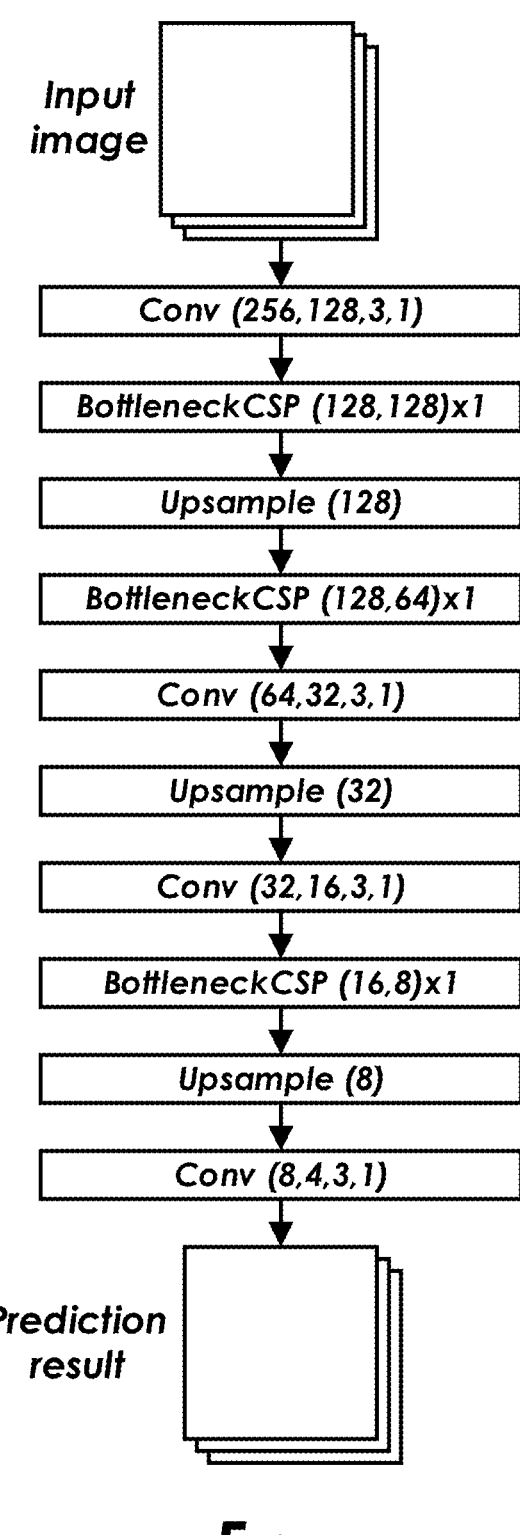
FIG. 6 is a schematic structural diagram of a branch network model according to an implementation of the present disclosure.

The branch network is constituted by four convolutional component (Conv) layers, three bottleneck CSP module layers, and three upsampling layers, as shown in FIG. 6. The BottleneckCSP module can enhance a feature fusion capability of the network and improve the detection precision. Therefore, the branch network in the present disclosure can obtain a high-precision output. In another implementation, a nearest interpolation method is used for upsampling processing in the upsampling layer, which can reduce a computational cost, thereby reducing reasoning time of the branch network.

In the FPN, the underlying feature map f1 is restored to a W×H×4 feature map after being processed by the three upsampling layers in the branch network (in other words, after undergoing the upsampling processing for three times), where W represents the width of the input image (for example, 640 pixels), H represents the height of the input image (for example, 384 pixels), feature points in the feature map one-to-one corresponds to pixels in the input image, and 4 represents that each feature point in the feature map has four values.

The branch network in the present disclosure segments the W×H×4 feature map into two W×H×2 feature maps. One W×H×2 feature map represents a probability that each pixel in the input image corresponds to a background of a drivable area, and is used to predict the drivable area, and the predicted drivable area is used as a result of the drivable area segmentation. The other W×H×2 feature map represents a probability that each pixel in the input image corresponds to a background of a lane line, and is used to predict the lane line, and the predicted lane line is used as a result of the lane line detection. W represents the width of the input image (for example, 640 pixels), H represents the height of the input image (for example, 384 pixels), and 2 represents that each feature point in the feature map has two values, which are respectively used to represent a probability that a corresponding pixel of the feature point has a target and a probability that the corresponding pixel of the feature point has no target.

In order to verify performance of the network model after the YOLOv5 is improved, appropriate evaluation indicators can be selected to evaluate the network model. The present disclosure uses an intersection over union (IoU) to evaluate segmentation of the drivable area and the lane line, and uses a mean intersection over union (mIoU) to evaluate segmentation performance of different models.

The IoU is used to measure pixel overlapping between a predicted mask map and a true mask map, as shown in a following formula:

$$IoU = TN/(TN + FP + FN)$$

In the above formula, TN represents a negative sample predicted as negative by the model, FP represents a negative sample predicted as positive by the model, and FN represents a positive sample predicted as negative by the model.

The mIoU is used to sum and average an IoU calculated for each prediction category (lane line prediction and drivable area prediction), as shown in a following formula:

$$mIoU = \frac{1}{K+1} \sum_{i=0}^{K} \frac{TP}{FN + FP + TP}$$

In the above formula, K represents a quantity of prediction categories, K+1 represents a quantity of prediction categories including a background category, TP represents a positive sample predicted as positive by the model, FP represents the negative sample predicted as positive by the model, and FN represents the positive sample predicted as negative by the model.

Performance indicators of an original model and an improved model are compared in a following table.

TABLE 1

Comparison of the performance indicators of the original model and the improved model

| Model | Recall | AP | mIoU | Accuracy | IoU | Speed |
|---|---|---|---|---|---|---|
| Original model | 89.2 | 76.5 | 91.5 | 70.5 | 26.2 | 11.0 |
| Improved model | 89.3 | 77.2 | 91.5 | 71.1 | 26.0 | 9.1 |

In the above table, the Recall, the AP (average precision), the mIoU, the Accuracy (accuracy of the lane line), and the IoU are in units of %, while the Speed (frame rate) is in units of ms/frame. From the data in Table 1, it can be seen that the improved model has achieved better recognition precision in various tasks. In the traffic target detection, the Recall reaches 89.3%, and the AP reaches 77.2%. In the drivable area segmentation, the mIoU reaches 91.5%. In the lane line detection, the Accuracy reaches 71.1%, the IoU reaches 26.0%, and the detection speed reaches 9.1 ms/frames. The experimental data result shows that the multi-task panoptic driving perception method based on improved YOLOv5 in the present disclosure has a good improvement effect on a panoptic driving perception task and meets a real-time requirement.

The multi-task panoptic driving perception method and system based on improved YOLOv5 in the present disclosure adopt a multi-task panoptic driving perception algorithm framework based on a YOLOv5 network structure, namely, the DP-YOLO, use an end-to-end network to achieve real-time and high-precision traffic target detection, drivable area segmentation, and lane line detection.

The multi-task panoptic driving perception method and system based on improved YOLOv5 in the present disclosure design the inverted residual bottleneck module (CSPI_x module), and replaces the original C3 module in the backbone network of the YOLOv5 with the inverted residual bottleneck module. The inverted residual bottleneck module (CSPI_x module) is constituted by the x inverted residual bottleneck component structures, where x is the natural number. The CSPI_x module maps the feature of the base layer onto the two parts, and then merges the two parts through the cross-stage hierarchical structure. This can greatly reduce the computational load of the backbone network and improve the running speed of the backbone network, while keeping the precision basically unchanged. For the system with the high real-time requirement, the inverted residual bottleneck module allows for the unique and effective memory management approach, thereby improving the recognition precision of the network model.

The multi-task panoptic driving perception method and system based on improved YOLOv5 in the present disclosure design the branch network, which is constituted by the four convolutional component (Conv) layers, the three BottleneckCSP module layers, and the three upsampling layers. The branch network can simultaneously train the drivable area segmentation and the lane line detection. The BottleneckCSP module can enhance the feature fusion capability of the network and improve the detection precision. The underlying layer of the FPN is input into a segmentation branch. The underlying layer of the FPN has the strong semantic information and the high-resolution information that is beneficial for positioning. Further, the nearest interpolation method is used in the upsampling layer for the upsampling processing to reduce the computational cost. The branch network in the present disclosure not only obtains the high-precision output, but also reduces its reasoning time, thereby increasing the feature extraction speed of the branch network while imposing a little impact on the precision.

Implementation 2

This implementation of the present disclosure provides a multi-task panoptic driving perception system based on improved YOLOv5, including:

> a human-computer interaction module configured to provide a reserved input interface to obtain input data in a correct format;
> a multi-task detection module configured to complete traffic target detection, lane line detection, and drivable area segmentation based on the input data obtained by the human-computer interaction module, and output results of the traffic target detection, the lane line detection, and the drivable area segmentation to a display module; and
> the display module configured to display the input data and the results of the traffic target detection, the lane line detection, and the drivable area segmentation that are output by the multi-task detection module.

In another implementation, the multi-task panoptic driving perception system based on improved YOLOv5 further includes:

> a traffic target detection module configured to complete the traffic target detection, and output the result of the traffic target detection, a traffic target category, and a precision rate of the traffic target detection to the display module, where when only a vehicle category in the traffic target category is detected, all vehicles are uniformly classified into the vehicle category for detection;
> a lane line detection module configured to complete the lane line detection, and output the result and a precision rate of the lane line detection to the display module; and
> a drivable area segmentation module configured to complete the drivable area segmentation and output the result of the drivable area segmentation to the display module.

The display module can also display the traffic target category, the precision rate of the traffic target detection, or the precision rate of the lane line detection.

The multi-task panoptic driving perception system based on improved YOLOv5 provided in the present disclosure facilitates presentation of the results of the traffic target detection, the lane line detection, and the drivable area segmentation that are separately performed according to the multi-task panoptic driving perception method based on improved YOLOv5, or results of a plurality of task simultaneously detected according to the multi-task panoptic driving perception method based on improved YOLOv5.

In some implementations, some aspects of the technique described above may be implemented by one or more processors of a processing system executing software. The software stores or tangibly implements in other ways one or more executable instruction sets on a non-transient computer-readable storage medium. The software may include instructions and some data which, when executed by one or more processors, manipulate the one or more processors to perform one or more aspects of the technique described above. The non-transient computer-readable storage medium may include, for example, a magnetic or optical disk storage device, such as a solid-state storage device like a flash memory, a cache, or a random access memory (RAM), or another nonvolatile memory device. An executable instruction stored on the non-transient computer-readable storage medium may be a source code, an assembly language code, a target code, or another instruction formation explained or executed in another way by one or more processors.

The multi-task panoptic driving perception method and system based on improved YOLOv5 in the present disclosure can simultaneously perform the traffic target detection, the drivable area segmentation, and the lane line detection. Compared with other existing methods, the present disclosure has a higher reasoning speed and higher detection accuracy. The multi-task panoptic driving perception method and system based on improved YOLOv5 in the present disclosure can better process surrounding scenario information of a vehicle, and then help a decision-making system of the vehicle make a judgment, thereby achieving good practical feasibility.

The computer-readable storage medium may include any storage medium accessible by a computer system to provide instructions and/or data to the computer system during use or a combination of storage mediums. Such a storage medium may include but be not limited to an optical medium (for example, a compact disc (CD), a digital versatile disc (DVD), or a blue-ray disc), a magnetic medium (for example, a floppy disc, a magnetic tape, or a magnetic hard drive), a volatile memory (for example, a random access memory (RAM) or a cache), a nonvolatile memory (for example, a read-only memory (ROM) or a flash memory), or a storage medium based on a micro electro mechanical system (MEMS). The computer-readable storage medium may be embedded in a computing system (for example, a system RAM or ROM), fixedly attached to a computing system (for example, a magnetic hard drive), removably attached to a computing system (for example, a CD or a flash memory based on a universal serial bus (USB)), or coupled to a computer system via a wired or wireless network (for example, a network accessible storage (NAS)).

It is noted that not all acts or elements in the above general description are essential and a part of a specific act or device may be not essential. Moreover, one or more further acts or included elements may be performed in addition to those described. Still further, the sequence of acts listed is not necessarily the sequence of performing them. Moreover, these concepts have been described with reference to specific implementations. However, it will be recognized by those of ordinary skill in the art that various alternations and changes may be made without departing from the scope of the present disclosure set forth in the appended claims. Therefore, the description and the accompanying drawings are considered to be illustrative rather than limiting, and all such alternations are included within the scope of the present disclosure.

Benefits, other advantages, and solutions to problems have been described above with respect to specific embodiments. However, benefits, advantages, and solutions to problems that may cause any benefit, advantage, or solution to occur or become more apparent and any feature should not be construed as critical or necessary features for any or other aspects or essential features for any or all claims. Moreover, the specific embodiments described above are merely illustrative because the disclosed subject matter may be modified and implemented in such a manner that is apparently different but equivalent for those skilled in the art who benefit from the teaching herein. In addition to those described in the claims, it is not intended to limit configurations shown herein or designed details. Therefore, it is that the specific embodiments disclosed above may be changed or alternated and all such changes are considered to be within the scope of the disclosed subject matter.

What is claimed is:

1. A multi-task panoptic driving perception method based on improved You Only Look Once version 5 (YOLOv5), comprising:

performing, by using an image preprocessing method of You Only Look Once version 4 (YOLOv4), image preprocessing on each frame of image in a video captured by a vehicle-mounted camera to obtain an input image;

extracting a feature of the input image by using a backbone network of the improved YOLOv5, to obtain a feature map, wherein the backbone network of the improved YOLOv5 is obtained by replacing a C3 module in a backbone network of YOLOv5 with an inverted residual bottleneck module; the inverted residual bottleneck module comprises x inverted residual bottleneck component structures, wherein x is a natural number; the inverted residual bottleneck component structures each comprise three layers, wherein a first layer is a convolutional component and maps a low-dimensional space onto a high-dimensional space for dimensional extension, a second layer is a deep separable convolutional layer and performs spatial filtering through deep separable convolution, and a third layer is a convolutional component Conv and maps the high-dimensional space onto the low-dimensional space;

inputting the feature map obtained by the backbone network of the improved YOLOv5 into a neck network, and fusing a feature map obtained through a spatial pyramid pooling (SPP) network and a feature pyramid network (FPN) and the feature map obtained by the backbone network of the improved YOLOv5 in the neck network to obtain a fused feature map;

inputting the fused feature map into a detection head, obtaining a multi-scale fused feature map through a path aggregation network (PAN), and performing traffic target detection on the multi-scale fused feature map by using an anchor-based multi-scale detection scheme of the YOLOv4; and inputting an underlying feature map of the feature map obtained through the SPP network and the FPN into a branch network, and performing lane line detection and drivable area segmentation by using the branch network.

2. The multi-task panoptic driving perception method based on improved YOLOv5 according to claim 1, wherein the image preprocessing further comprises adjusting each frame of image in the video captured by the vehicle-mounted camera from an image whose width×height×channel quantity is 1280×720×3 to an image whose width>height×channel quantity is 640×384×3.

3. The multi-task panoptic driving perception method based on improved YOLOv5 according to claim 1, wherein the backbone network of the improved YOLOv5 adopts three inverted residual bottleneck modules;

a first inverted residual bottleneck module is CSPI_1, which comprises the convolutional component Conv and one inverted residual bottleneck component structure through a Concat operation;

a second inverted residual bottleneck module is CSPI_3, which comprising the convolutional component Conv and two inverted residual bottleneck component structures through the Concat operation;

a third inverted residual bottleneck module is the CSPI_3, which comprising the convolutional component Conv and three inverted residual bottleneck component structures through the Concat operation;

the convolutional component Conv comprises a conv function, a Bn function, and a SiLU function;

the feature map obtained by extracting the feature of the input image by using the backbone network of the improved YOLOv5 comprises a feature map out1, a feature map out2, and a feature map out3;

the feature map out1 is a feature map obtained after a preprocessed image is processed first by Focus, then by the convolution component_Conv and the CSPI_1, and finally by the convolution component Conv and the CSPI_3;

the feature map out2 is a feature map obtained after the feature map out1 is processed by the convolution component Conv and the CSPI_3; and the feature map out3 is a feature map obtained after the feature map out2 is processed by the convolution component Conv.

4. The multi-task panoptic driving perception method based on improved YOLOv5according to claim 3, wherein in the FPN, the feature map input by the SPP network is processed by the inverted residual bottleneck module and the convolution component Conv in sequence to obtain a high-level feature map f3, and the high-level feature map f3 is output to the detection head;

the high-level feature map f3 is upsampled, a feature map obtained by performing the Concat operation on an upsampled high-level feature map f3 and the feature map out2 is processed by the inverted residual bottleneck module and the convolution component_Conv in sequence to obtain a mid-level feature map f2, and the mid-level feature map f2 is output to the detection head; and the mid-level feature map f2 is upsampled, and then an underlying feature map f1 is obtained by performing the Concat operation on an upsampled mid-level feature map f2 and the feature map out1 and output to the detection head.

5. The multi-task panoptic driving perception method based on improved YOLOv5 according to claim 4, wherein the branch network comprises four convolutional component layers, three BottleneckCSP module layers, and three upsampling layers; and the performing lane line detection and drivable area segmentation by using the branch network comprises:

restoring the underlying feature map f1 in the FPN to a W×H×4 feature map after processing the underlying feature map f1 by the three upsampling layers in the branch network, wherein W represents a width of the input image, H represents a height of the input image, feature points in the feature map one-to-one correspond to pixels in the input image, and 4 represents that each feature point in the feature map has four values; and segmenting, by the branch network, the W×H×4 feature map into two W×H×2 feature maps, wherein one of the W×H×2 feature maps represents a probability that each pixel in the input image corresponds to a background of a drivable area, and is used to predict the drivable area to generate a predicted drivable area, and the predicted drivable area is used as a result of the drivable area segmentation; and the other W×H×2 feature map represents a probability that each pixel in the input image corresponds to a background of a lane line, and is used to predict the lane line, and the predicted lane line is used as a result of the lane line detection, wherein W represents the width of the input image; H represents the height of the input image; and 2 represents that each feature point in the feature map has two values, which are respectively used to represent a probability that a corresponding pixel of the feature point has a target and a probability that the corresponding pixel of the feature point has no target.

6. The multi-task panoptic driving perception method based on improved YOLOv5 according to claim 5, wherein a nearest interpolation method is used in one of the upsampling layers for upsampling processing.

7. A multi-task panoptic driving perception system based on improved YOLOv5 for implementing the multi-task panoptic driving perception method based on improved YOLOv5 according to claim 1, comprising:

a human-computer interaction module configured to provide a reserved input interface to obtain input data in a correct format;

a multi-task detection module configured to complete traffic target detection, lane line detection, and drivable area segmentation based on the input data obtained by the human-computer interaction module, and to output results of the traffic target detection, the lane line detection, and the drivable area segmentation to a display module; and the display module configured to display the input data and the results of the traffic target detection, the lane line detection, and the drivable area segmentation that are output by the multi-task detection module.

8. The multi-task panoptic driving perception system based on improved YOLOv5 according to claim 7, further comprising:

a traffic target detection module configured to complete the traffic target detection, and output the results of the traffic target detection, a traffic target category, and a precision rate of the traffic target detection to the display module;

a lane line detection module configured to complete the lane line detection, and output the results and a precision rate of the lane line detection to the display module; and a drivable area segmentation module configured to complete the drivable area segmentation and output the results of the drivable area segmentation to the display module;

wherein the display module is capable of displaying the traffic target category, the precision rate of the traffic target detection, or the precision rate of the lane line detection.

9. A multi-task panoptic driving perception device based on improved YOLOv5, comprising a memory and a processor, wherein the memory stores a computer program for implementing a multi-task panoptic driving perception method based on improved YOLOv5, and the processor executes the computer program to implement steps of the method according to claim 1.

10. A non-transitory computer-readable storage medium storing a computer program, wherein the computer program is executed by a processor to implement steps of the method according to claim 1.

11. The multi-task panoptic driving perception system based on improved YOLOv5 according to claim 7, wherein the image preprocessing further comprises adjusting each frame of image in the video captured by the vehicle-mounted camera from an image whose width>height×channel quantity is 1280×720×3 to an image whose width>height×channel quantity is 640×384×3.

12. The multi-task panoptic driving perception system based on improved YOLOv5 according to claim 7, wherein the backbone network of the improved YOLOv5 adopts three inverted residual bottleneck modules;

a first inverted residual bottleneck module is CSPI_1, which comprises the convolutional component Conv and one inverted residual bottleneck component structure through a Concat operation;

a second inverted residual bottleneck module is CSPI_3, which comprises the convolutional component Conv and two inverted residual bottleneck component structures through the Concat operation;

a third inverted residual bottleneck module is the CSPI_3, which comprises the convolutional component Conv and three inverted residual bottleneck component structures through the Concat operation;

the convolutional component Conv comprises a conv function, a Bn function, and a SiLU function;

the feature map obtained by extracting the feature of the input image by using the backbone network of the improved YOLOv5 comprises a feature map out1, a feature map out2, and a feature map out3;

the feature map out1 is a feature map obtained after a preprocessed image is processed first by Focus, then by the convolution component Conv and the CSPI_1, and finally by the convolutional component Conv and the CSPI_3;

the feature map out2 is a feature map obtained after the feature map out1 is processed by the convolutional component Conv and the CSPI_3; and the feature map out3 is a feature map obtained after the feature map out2 is processed by the convolutional component Conv.

13. The multi-task panoptic driving perception system based on improved YOLOv5 according to claim 12, wherein in a feature pyramid network (FPN), the feature map input by a spatial pyramid pooling (SPP) network is processed by the inverted residual bottleneck module and the convolution component Conv in sequence to obtain a high-level feature map f3, and the high-level feature map f3 is output to the detection head;

the high-level feature map f3 is upsampled, a feature map obtained by performing the Concat operation on an upsampled high-level feature map f3 and the feature map out2 is processed by the inverted residual bottleneck module and the convolution component Conv in sequence to obtain a mid-level feature map f2, and the mid-level feature map f2 is output to the detection head; and the mid-level feature map f2 is upsampled, and then an underlying feature map f1 is obtained by performing the Concat operation on an upsampled mid-level feature map f2 and the feature map out1 and output to the detection head.

14. The multi-task panoptic driving perception system based on improved YOLOv5 according to claim 13, wherein the branch network comprises four convolutional component layers, three BottleneckCSP module layers, and three upsampling layers; and the performing lane line detection and drivable area segmentation by using the branch network comprises: restoring the underlying feature map f1 in the FPN to a W×H×4 feature map after processing the underlying feature map f1 by the three upsampling layers in the branch network, wherein W represents a width of the input image, H represents a height of the input image, feature points in the feature map one-to-one correspond to pixels in the input image, and 4 represents that each feature point in the feature map has four values; and segmenting, by the branch network, the W×H×4 feature map into two W×H×2 feature maps, wherein one of the W×H×2 feature maps represents a probability that each pixel in the input image corresponds to a background of a drivable area, and is used to predict the drivable area to generate a drivable area, and the predicted drivable area is used as a result of the drivable area segmentation; and the other W×H×2 feature map represents a probability that each pixel in the input image corresponds to a background of a lane line, and is used to predict the lane line, and the predicted lane line is used as a result of the lane line detection, wherein W represents the width of the input image; H represents the height of the input image; and 2 represents that each feature point in the feature map has two values, which are respectively used to represent a probability that a corresponding pixel of the feature point has a target and a probability that the corresponding pixel of the feature point has no target.

15. The multi-task panoptic driving perception system based on improved YOLOv5 according to claim 14, wherein a nearest interpolation method is used in one or more of the upsampling layers for upsampling processing.

16. The multi-task panoptic driving perception device based on improved YOLOv5, comprising a memory and a processor according to claim 9, wherein the image preprocessing further comprises adjusting each frame of image in the video captured by the vehicle-mounted camera from an image whose width>height×channel quantity is 1280× 720×3 to an image whose width>height×channel quantity is 640×384×3.

17. The multi-task panoptic driving perception device based on improved YOLOv5, comprising a memory and a processor according to claim 9, wherein the backbone network of the improved YOLOv5 adopts three inverted residual bottleneck modules;

a first inverted residual bottleneck module is CSPI_1, which comprises a convolutional component Conv and one inverted residual bottleneck component structure through a Concat operation;

a second inverted residual bottleneck module is CSPI_3, which comprises the convolutional component Conv and two inverted residual bottleneck component structures through the Concat operation;

a third inverted residual bottleneck module is the CSPI_3, which is comprises the convolutional component Conv and three inverted residual bottleneck component structures through the Concat operation;

the convolutional component Conv comprises a conv function, a Bn function, and a SiLU function;

the feature map obtained by extracting the feature of the input image by using the backbone network of the improved YOLOv5 comprises a feature map out1, a feature map out2, and a feature map out3;

the feature map out1 is a feature map obtained after a preprocessed image is processed first by Focus, then by the convolutional component Conv and the CSPI_1, and finally by the convolutional component Conv and the CSPI_3;

the feature map out2 is a feature map obtained after the feature map out1 is processed by the convolutional component Conv and the CSPI_3; and the feature map out3 is a feature map obtained after the feature map out2 is processed by the convolutional component Conv.

18. The multi-task panoptic driving perception device based on improved YOLOv5, comprising a memory and a processor according to claim 17, wherein in the FPN, the feature map input by the SPP network is processed by the inverted residual bottleneck module and the convolution component Conv in sequence to obtain a high-level feature map f3, and the high-level feature map f3 is output to the detection head;

the high-level feature map f3 is upsampled, a feature map obtained by performing the Concat operation on an upsampled high-level feature map f3 and the feature map out2 is processed by the inverted residual bottleneck module and the convolution component Conv in sequence to obtain a mid-level feature map f2, and the mid-level feature map f2 is output to the detection head; and the mid-level feature map f2 is upsampled, and then an underlying feature map f1 is obtained by performing the Concat operation on an upsampled mid-level feature map f2 and the feature map out1 and output to the detection head.

19. The multi-task panoptic driving perception device based on improved YOLOv5, comprising a memory and a processor according to claim 18, wherein the branch network comprises four convolutional component layers, three BottleneckCSP module layers, and three upsampling layers; and the performing lane line detection and drivable area segmentation by using the branch network comprises: restoring the underlying feature map f1 in the FPN to a W×H×4 feature map after processing the underlying feature map f1 by the three upsampling layers in the branch network, wherein W represents a width of the input image, H represents a height of the input image, feature points in the feature map one-to-one correspond to pixels in the input image, and 4 represents that each feature point in the feature map has four values; and segmenting, by the branch network, the W×H×4 feature map into two W×H×2 feature maps, wherein one of the W×H×2 feature maps represents a probability that each pixel in the input image corresponds to a background of a drivable area, and is used to predict the drivable area to generate a drivable area, and the predicted drivable area is used as a result of the drivable area segmentation; and the other W×H×2 feature map represents a probability that each pixel in the input image corresponds to a background of a lane line, and is used to predict the lane line, and the predicted lane line is used as a result of the lane line detection, wherein W represents the width of the input image; H represents the height of the input image; and 2 represents that each feature point in the feature map has two values, which are respectively used to represent a probability that a corresponding pixel of the feature point has a target and a probability that the corresponding pixel of the feature point has no target.

20. The multi-task panoptic driving perception device based on improved YOLOv5, comprising a memory and a processor according to claim 19, wherein a nearest interpolation method is used in one or more of the upsampling layers for upsampling processing.

\* \* \* \* \*